June 6, 1950          A. E. RICE          2,510,835
BROACHING TOOL
Filed May 17, 1946
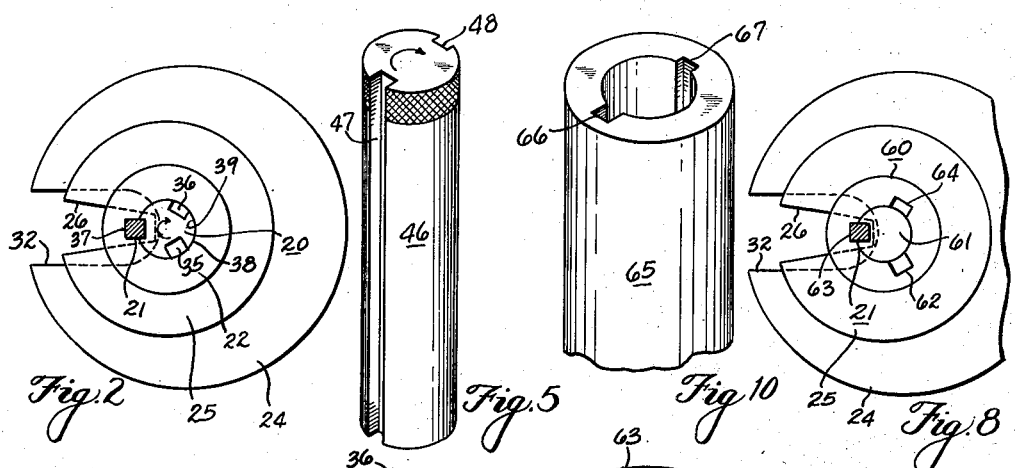
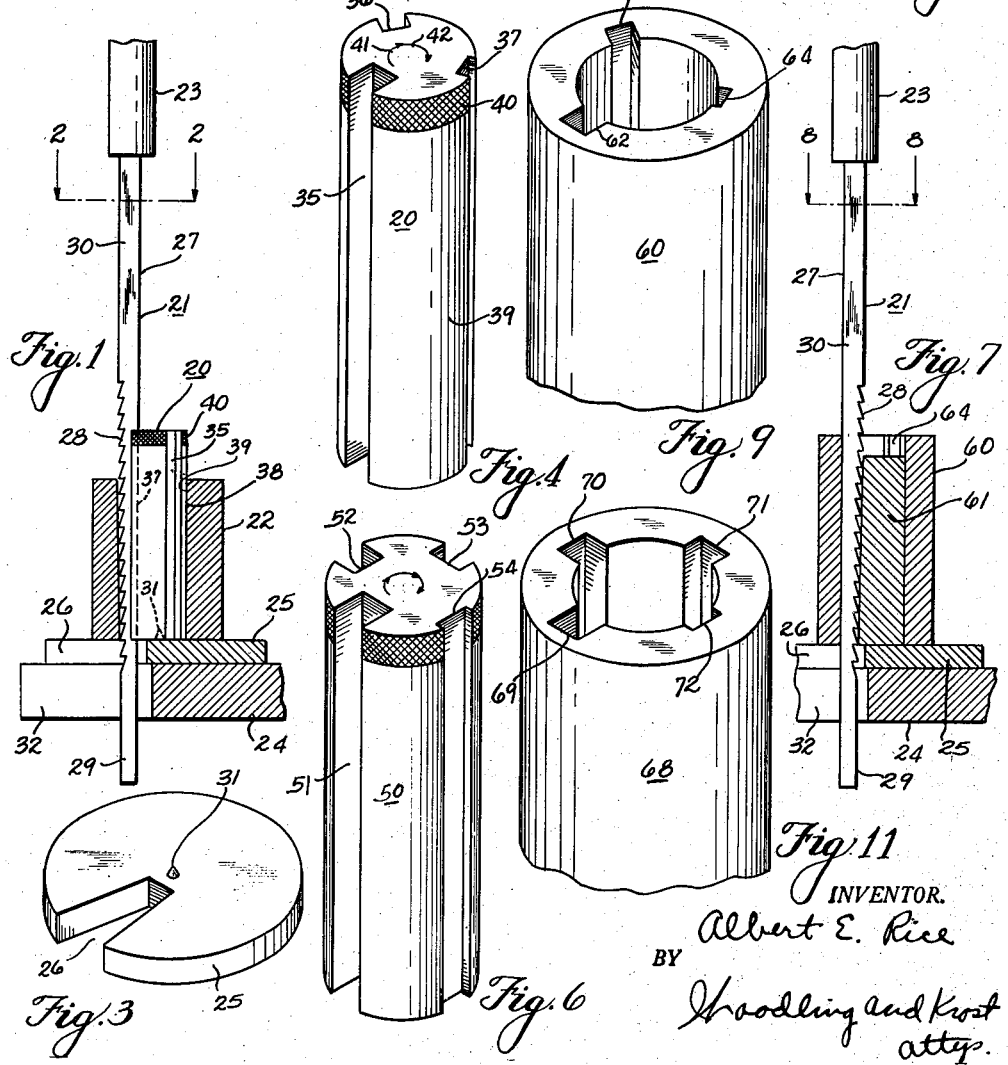

Patented June 6, 1950

2,510,835

UNITED STATES PATENT OFFICE 2,510,835

BROACHING TOOL

Albert E. Rice, Cleveland, Ohio

Application May 17, 1946, Serial No. 670,621

4 Claims. (Cl. 90—33)

My invention relates in general to a broaching tool, and more particularly to a combination broaching tool comprising a broaching element and a guide element for guiding the broaching element with reference to the workpiece.

An object of my invention is the provision of a broaching element and a guide element for guiding and holding the broaching element as it is moved relative to the workpiece.

Another object of my invention is the provision of a broaching element which need not be carried by a mandrel or other support during the broaching operation.

Another object of my invention is the provision of a single broaching element which is of a unitary structure and which is subjected to the entire broaching load during the broaching operation.

Other objects and a fuller understanding of my invention may be had by referring to the following description and claims taken in combination with the accompanying drawings, in which:

Figure 1 is a side elevational view of my combined broaching tool with the workpiece and other associated parts shown in cross-section;

Figure 2 is a plan view of the arrangement shown in Figure 1;

Figure 3 is a perspective view of a support plate for supporting the workpiece and the guide element during broaching operation;

Figure 4 is an enlarged perspective view of the guide element shown in Figure 1;

Figure 5 is an enlarged perspective view of a modified guide element;

Figure 6 is an enlarged perspective view of a further modified guide element;

Figure 7 is a side elevational view of a modified form of a combined broaching tool and guide element, the guide element, the workpiece and other associated parts being shown in section;

Figure 8 is a plan view of Figure 7;

Figure 9 is an enlarged fragmentary perspective view of the guide element shown in Figure 7;

Figure 10 is an enlarged fragmentary perspective view of a modified guide element; and Figure 11 is an enlarged fragmentary perspective view of a further modified guide element.

With reference to Figure 1 of the drawing, my combined broaching tool comprises a broaching element 21 which is adapted to be guided by a guide element 20 for holding the broaching element 21 against a workpiece 22 during broaching operation. The workpiece 22 may be in the form of a sleeve, or it may be the hub of a wheel designed to have a keyway broach therein. The workpiece is adapted to rest on top of a support plate 25, which in turn is supported by a work table 24. The broaching element 21 is pressed downwardly by means of a ram 23 which may be operated by any source of power. In actual practice, the ram 23 and the work table 24 may constitute any well-known type of press which is found in most workshops and factories. The work table is provided with a work clearance segmental opening 32, through which the broaching element is directed during the broaching operation. The support plate 25 may also be provided with a work clearance segmental opening 26 through which the broaching element 21 is directed during the broaching operation. The top surface of the support plate 25 may be provided with a centering tip 31 at the center thereof which serves as a means to center the guide element 20 thereupon, the guide element having a small centering conical opening in the bottom therein which sets over the centering tip 31. The guide element 20 in Figure 1 is shown in an enlarged perspective view in Figure 4 and comprises preferably a solid piece of metal having an annular external surface 39 provided with three guide grooves 35, 36 and 37. The depth of the guide groove 35 is greater than the depth of the guide grooves 36 and 37, and the depth of the guide groove 36 is greater than the depth of the guide groove 37. The top portion of the guide element 20 may be provided with a knurled gripping portion 40 to facilitate the turning of the guide element within the workpiece.

The broaching element 21 has a straight longitudinal backing wall 27 and a plurality of cutting teeth 28 on the opposite side wall. The backing wall 27 and the cutting teeth 28 define a slow taper with the small lower end 29 of the broaching element constituting the starting end. The upper end is provided with an elongated shank 30 which is long enough to extend through the guide grooves in the guide element.

In operation, the workpiece 22 is placed upon the support plate 25, after which the guide element 20 is inserted in the opening 38 of the workpiece. In actual practice, the external annular surface 39 of the guide element makes a free but close sliding fit with the internal annular surface 38 of the workpiece. The groove 35 is aligned with the workpiece where it is desired to broach the keyway in the workpiece. The groove 35 in combination with the workpiece defines a first opening to receive the starting end 29 of the broaching element. The next step in the operation is to cause the ram 23 to press the broaching element 21 downwardly through the groove 35. When all of the teeth 28 have completed the cutting of the keyway slot in the workpiece, the broaching element may thereafter be easily drawn through the cut slot, since the shank section 30 is slightly smaller in cross-section than the combined slot and groove 35. After the broaching element is drawn through the groove 35, the next step is to turn the guide element 20 until the guide groove 36 is brought into alignment with the cut slot, after which the broaching element is again pushed downwardly, cutting a deeper slot in the workpiece. After the second cut is made and the broaching element is removed, the guide element 20 is rotated within the workpiece until the guide groove 37 is brought into alignment with the cut slot. The broaching tool then is forced through the groove 37 for cutting the full depth of the slot or keyway in the workpiece. The depth of the slots in the guide grooves 35, 36 and 37 are progressively decreased so that the opening defined by the slot 35 and the internal annular surface 38 of the workpiece is substantially the same as the openings defined respectively by the guide grooves 36 and 37 with their respective slot depths cut in the workpiece. The upper end of the guide element 20 may be provided with indicating arrows 41 and 42, which serve as a guide for an operator and indicates that the guide element 20 is progressively rotated first from the guide groove 35 to the guide groove 36, and then from the guide groove 36 to the guide groove 37.

In Figure 5, I show a modified guide element 46, in that it has but two guide grooves 47 and 48, the guide groove 47 being deeper than the guide groove 48.

In Figure 6, I show a further modified guide element 50, in that it has four guide grooves 51, 52, 53 and 54 of gradually decreasing depths. The guide element in Figure 5 is preferably made for workpieces having small openings therein to be broached, whereas the guide elements in Figures 4 and 6 are designed for workpieces having larger diameter openings to be broached. In actual practice, the guide elements may vary from ⅜ of an inch up to 1⅞ inches or larger in diameter.

The guide elements shown in Figures 1, 4, 5 and 6 are designed for broaching keyways in sleeves or hubs having an internal annular surface. In Figures 7 to 11, I show a modified form of my invention for broaching keyways or slots in workpieces having an external annular surface. Thus, in Figure 7, the guide element 60 constitutes an annular body having an internal annular surface provided with three guide grooves 62, 63 and 64. The guide element 60 is adapted to freely and slidably fit over the workpiece 61, which is in the form of a round annular body. The workpiece 61 in the drawing is shown as being shorter than the guide element 60, but in actual practice the workpiece may be of any length, so long as it does not extend out of the guide element too far. The groove 62 is deeper than the grooves 63 and 64, and the groove 63 is deeper than the groove 64. The guide element 60 shown in Figure 7 is the same as the guide element shown in Figure 9. The operation for the external guide element 60 in Figure 7 is the same as the operation for the internal guide element as shown in Figure 1, in that the grooves 62, 63 and 64 are progressively used for cutting the slot deeper into the workpiece. The Figure 10 shows a modified guide element 65 having two grooves 66 and 67 therein, the groove 66 being deeper than the groove 67. Figure 11 shows a further modified guide element 68 having guide grooves 69, 70, 71 and 72 therein, the grooves being of gradually decreasing depth in the order named. The broaching element 21 may be the same both for the internal guide element or the external guide element. It is noted, that the broaching element comprises but a single unitary piece and carries the entire load during the broaching operation, in that it is not carried by a mandrel or other device during the broaching operation. In actual practice, a set of broaching elements and guide elements are provided, whereby the operator has a large selection of tools for accommodating workpieces of various sizes and of various dimensioned keyway slots.

Although I have described my invention with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

I claim as my invention:

1. A tool for broaching a slot in a work piece having an annular surface, said tool comprising a guide element having an annular surface for fitting against the annular surface of the work piece, said guide element having at least a first guide groove and a second guide groove annularly spaced thereabout, said first guide groove being deeper than said second guide groove, and an elongated tapered broaching element having a longitudinal side provided with cutting teeth and an opposite longitudinal side constituting a backing wall, said backing wall and said cutting teeth defining a taper with the small end thereof constituting the starting end, said starting end fitting into said first guide groove with the cutting teeth facing the work piece for broaching a slot in the work piece as the broaching element passes through the first guide groove, said guide element being turnable relative to the work piece for annularly aligning the second guide groove with the slot cut into the work piece by the broaching element passing through the first guide groove, said starting end fitting into the second guide groove and the said slot with the teeth facing the work piece for broaching the said slot deeper into the work piece as the broaching element passes through the second guide groove.

2. A tool for broaching a slot in a workpiece having an annular surface, said tool comprising a guide element having an annular surface for fitting against the annular surface of the workpiece, said guide element having at least a first guide groove and a second guide groove annularly spaced thereabout, said first guide groove being deeper than said second guide groove, said first guide groove defining in combination with the workpiece a first opening, and an elongated tapered broaching element having a longitudinal side provided with cutting teeth and an opposite longitudinal side constituting a backing wall, said backing wall and said cutting teeth defining a taper with the small end thereof constituting the starting end, said starting end fitting into said first opening with the cutting teeth facing the workpiece for broaching a slot in the workpiece as the broaching element passes through the first guide groove, said guide element being turnable relative to the workpiece for annularly aligning the second guide groove with the slot cut into the workpiece by the broaching element passing through the first guide groove, said second guide groove defining in combination with said aligned slot a second opening, said starting end fitting into the second opening with the teeth facing the workpiece for broaching the said slot deeper into the workpiece as the broaching element passes through the second guide groove.

3. A tool for broaching a slot in a workpiece having an internal annular surface, said tool comprising a guide element having an external annular surface for fitting against the internal annular surface of the workpiece, said guide element having at least a first guide groove and a second guide groove annularly spaced thereabout, said first guide groove being deeper than said second guide groove, said first guide groove defining in combination with the workpiece a first opening, and an elongated tapered broaching element having a longitudinal side provided with cutting teeth and an opposite longitudinal side constituting a backing wall, said backing wall and said cutting teeth defining a taper with the small end thereof constituting the starting end, said starting end fitting into said first opening with the cutting teeth facing the workpiece for broaching a slot in the workpiece as the broaching element passes through the first guide groove, said guide element being turnable relative to the workpiece for annularly aligning the second guide groove with the slot cut into the workpiece by the broaching element passing through the first guide groove, said second guide groove defining in combination with said aligned slot a second opening, said starting end fitting into the second opening with the teeth facing the workpiece for broaching the said slot deeper into the workpiece as the broaching element passes through the second guide groove.

4. A tool for broaching a slot in a workpiece having an external annular surface, said tool comprising a guide element having an internal annular surface for fitting against the external annular surface of the workpiece, said guide element having at least a first guide groove and a second guide groove annularly spaced thereabout, said first guide groove being deeper than said second guide groove, said first guide groove defining in combination with the workpiece a first opening, and an elongated tapered broaching element having a longitudinal side provided with cutting teeth and an opposite longitudinal side constituting a backing wall, said backing wall and said cutting teeth defining a taper with the small end thereof constituting the starting end, said starting end fitting into said first opening with the cutting teeth facing the workpiece for broaching a slot in the workpiece as the broaching element passes through the first guide groove, said guide element being turnable relative to the workpiece for annularly aligning the second guide groove with the slot cut into the workpiece by the broaching element passing through the first guide groove, said second guide groove defining in combination with said aligned slot a second opening, said starting end fitting into the second opening with the teeth facing the workpiece for broaching the said slot deeper into the workpiece as the broaching element passes through the second guide groove.

ALBERT E. RICE.

REFERENCES CITED

The following references are of record in the file of this patent:

UNITED STATES PATENTS

| Number | Name | Date |
|---|---|---|
| 2,050,901 | Sundell | Aug. 11, 1936 |
| 2,393,646 | Markstrum | Jan. 29, 1946 |

FOREIGN PATENTS

| Number | Country | Date |
|---|---|---|
| 23,335 | Great Britain | Dec. 18, 1913 |